US009686168B1

(12) United States Patent
Patidar et al.

(10) Patent No.: US 9,686,168 B1
(45) Date of Patent: Jun. 20, 2017

(54) MANAGING COMPONENT CAPACITY

(71) Applicant: Amazon Technologies, Inc., Reno, NV (US)

(72) Inventors: Abhishek Patidar, Seattle, WA (US); Peter Gerard O'Connor, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 247 days.

(21) Appl. No.: 14/447,405

(22) Filed: Jul. 30, 2014

(51) Int. Cl.
*G06F 15/173* (2006.01)
*H04L 12/26* (2006.01)
*G06F 17/30* (2006.01)

(52) U.S. Cl.
CPC .... *H04L 43/0805* (2013.01); *G06F 17/30864* (2013.01)

(58) Field of Classification Search
CPC ........ H04L 47/10; H04L 47/522; H04L 47/74
USPC ....................................................... 709/224
See application file for complete search history.

(56) References Cited

U.S. PATENT DOCUMENTS

| 2014/0094159 A1* | 4/2014 | Raleigh | H04W 24/02 455/418 |
| 2014/0181302 A1* | 6/2014 | Sahoo | H04L 67/303 709/225 |
| 2014/0244819 A1* | 8/2014 | Patrick | H04L 41/0806 709/223 |

* cited by examiner

*Primary Examiner* — Wing F Chan
*Assistant Examiner* — Andrew Woo
(74) *Attorney, Agent, or Firm* — Klarquist Sparkman, LLP

(57) ABSTRACT

Disclosed herein are systems and methods for managing data transmission capacity between endpoints in a computing environment. The systems and methods are operable to receive, store and track information regarding data transmission components installed in the environment, and operable to receive, store and track information regarding how much of the total data transmission capacity between a given pair of endpoints in the system is being used, is reserved for future use, or is available for use. This information can be compared to predetermined threshold values to determine whether additional data transmission hardware should be added to the environment to increase the data transmission capacity.

15 Claims, 10 Drawing Sheets

FIG. 2

| CONNECTOR ID 202 | CONN. CLASS 204 | END POINT A ID 206 | END POINT B ID 208 | END POINT A BARCODE 210 | END POINT B BARCODE 212 | MAX CAPACITY 214 | USED CAPACITY 216 | RESERVED CAPACITY 218 | LOCATION 220 |
|---|---|---|---|---|---|---|---|---|---|
| 110 | CLASS A | 102 | 104 | # | # | MAX A | USED A | RES. A | 100 |
| 112 | CLASS B | 102 | 106 | # | # | MAX B | USED B | RES. B | 100 |
| 114 | CLASS C | 106 | 104 | # | # | MAX C | USED C | RES. C | 100 |
| 116 | CLASS D | 102 | 108 | # | # | MAX D | USED D | RES. D | 100 |
| 118 | CLASS E | 108 | 104 | # | # | MAX E | USED E | RES. E | 100 |
| 120 | CLASS F | 104 | EXT. | # | # | MAX F | USED F | RES. F | 100 |
| X | CLASS G | # | # | # | # | MAX G | USED G | RES. G | # |
| Y | CLASS H | # | # | # | # | MAX H | USED H | RES. H | # |
| Z | CLASS I | # | # | # | # | MAX I | USED I | RES. I | # |
| ... | ... | ... | ... | ... | ... | ... | ... | ... | ... |

| ENDPOINT ID 302 | ENDPOINT TYPE 304 | ENDPOINT LOCATION 306 | TOTAL PORTS 308 | USED PORTS 310 | MAXIMUM CAPACITY 312 | INSTALLED CAPACITY 314 | RES. CAP. 316 | CONNECTOR CLASS 318 | INSTALLED CONNECTORS 320 |
|---|---|---|---|---|---|---|---|---|---|
| 102 | TYPE A | 100 | # | # | MAX A | INST. A | RES. A | CLASS A | 110, 112, 116 |
| 104 | TYPE B | 100 | # | # | MAX B | INST. B | RES. B | CLASS B | 110, 114, 118, 120 |
| 106 | TYPE C | 100 | # | # | MAX C | INST. C | RES. C | CLASS C | 112, 114 |
| 108 | TYPE D | 100 | # | # | MAX D | INST. D | RES. D | CLASS D | 116, 118 |
| X | TYPE E | # | # | # | MAX E | INST. E | RES. E | CLASS E | #, #, # |
| Y | TYPE F | # | # | # | MAX F | INST. F | RES. F | CLASS F | #, #, # |
| Z | TYPE G | # | # | # | MAX G | INST. G | RES. G | CLASS G | #, #, # |
| ... | ... | ... | ... | ... | ... | ... | ... | ... | ... |

300

MANAGING COMPONENT CAPACITY

BACKGROUND

Complex network cabling in data centers can pose a challenge to managing the data transmission capacity between the many different endpoints in the network. Lack of adequate data transmission capacity can cause impediments to many different types of operations that rely on timely data transmission between two or more endpoints. For example, the ever-growing complexity of data centers has created a challenge to manage data transmission capacity between a multitude of endpoints in the data center that are interconnected by optical fibers, metal wires, or other data connectors. Managing the capacity of conduits, risers, and other structures that physically constrain data transmission cables is also a challenge.

BRIEF DESCRIPTION OF DRAWINGS

FIGS. 2 and 3 are tables including exemplary data related to system endpoints and connectors.

DETAILED DESCRIPTION

Figure 1:
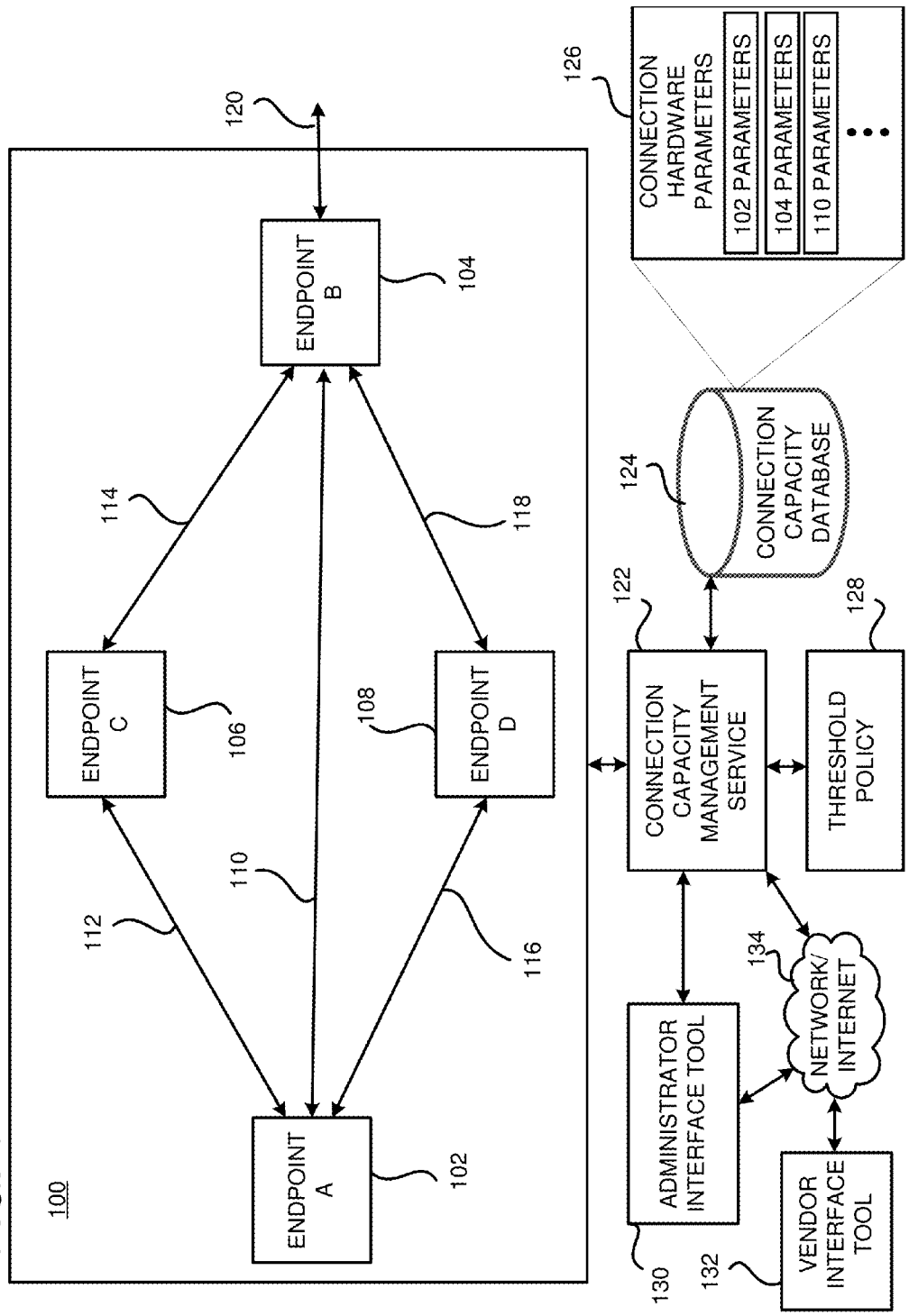
FIG. 1 is a diagram of an exemplary system for managing components capacity between endpoints.

Disclosed herein are systems and methods for efficiently managing the capacity of components involved in data transmission in a given computing environment. The computing environment to be managed can have any scale, such as large intercontinental networks, groups of data centers in a given geographic region, a single data center facility, portions of a data center, a single room or local area network, or other type of computing environment. As used herein, the term "data center" is used broadly to mean any facility used to house a plurality of networked computing and storage systems, including but not limited to a colocation center or a transit center.

As a data center or other computing environment grows, more and more components and associated data transmission connections are typically added, while some components and connections may be removed or replaced. The resulting web of complexity can quickly become very difficult and resource-consuming to manually track. Furthermore, tracking the amount of the installed data transmission capacity that is used, reserved for future use, or otherwise unavailable, and the resulting available capacity for additional use, can be very difficult. However, tracking and managing these capacity parameters of a computing environment can be critical to successful operation.

When the volume of data transmission increases between a given pair of endpoints (e.g., any two points in the environment that are connected for data transmission between them), and the amount of available capacity becomes low, larger and/or additional data transmission connectors (optical fibers, wires, etc.) may need to be added to increase the maximum data transmission capacity between the two endpoints. Such data transmission connectors are often constrained and/or directed by non-data-transmission connection devices (e.g., conduits, risers, sleeves, trays, raceways, etc.), which can have important physical capacity limitations as well. For example, a conduit or tube that contains and routes a group of optical fiber cables between two endpoints may have a given cross-sectional area that limits the total number cables that it can contain. Accordingly, as the data transmission demand increases and more and more fibers are added to add data capacity, additional and/or larger conduits may need to be added to contain all the fibers. Collectively, optical fibers, wire cables, conduits, risers, and other devices connecting endpoints in a network environment can be referred to as "passive infrastructure" or "passive components." The term "data transmission capacity" refers to the overall data throughput along a route, including both the physical/spatial capacity of conduits, risers and other structures, as well as the bits-per-second transmission capacity (e.g., GBPS) of optical fibers, wires, and other cables.

In addition, as the volume of data transmission increases through a given endpoint component (e.g., a single server, a patch panel, a room of a data center, a floor of a data center, an entire data center, etc.) and the endpoint component's available capacity becomes low, additional endpoint components may need to be added to increase the maximum capacity. For example, a given patch panel may have 48 ports for receiving up to 48 different fiber cables, such that if more than 48 fiber cables are desired to be connected at that location, additional patch panels may need to be installed. Similarly, a given patch panel may have a maximum total data throughput capacity, and if more than that maximum total throughput is desired at that location, additional patch panels or other components may need to be installed.

FIG. 1 illustrates an exemplary system for managing the data transmission capacities among various components and connections associated with a computing environment 100. The environment 100 can include any number of endpoint components and connections between the endpoints, though only a representative selection of endpoints and connections are shown in FIG. 1. Blocks 102, 104, 106, and 108 represent four endpoint components in the environment 100, and arrows 110, 112, 114, 116, 118 represent data transmission connections between the endpoint connections. Arrow 120 represents a data transmission connection between endpoint 104 and an external endpoint outside of the environment 100.

A connection capacity management service 122 and an associated connection capacity database 124 can be used to track and manage information about the various components in the environment 100. The database 124 can include any number of data sets, represented collectively by table 126, where the information about the capacities of the components in the environment 100. FIGS. 2 and 3 illustrate exemplary data sets that can be included in the database 124.

The service 122 can also be coupled to a threshold policy 128 that provides information regarding predetermined capacity thresholds and optionally associated timebound constraints for the various components. The predetermined capacity thresholds can include, for example, a minimum available capacity for a given component such that when the available capacity of that given component falls below the minimum available capacity threshold, the service 122 can determine that additional components should be added to increase the maximum total capacity. Such determination may also consider an estimated amount of time that is required to add hardware in order to augment the maximum total capacity.

The threshold policy 128, and/or other portions of the system, can include a database of site specific time constraints required to provide and/or install new capacity (provisioning lead time), which helps trigger the action at appropriate time. Such time constraints can include the amount of time that is required to acquire and install a given amount of new capacity of a certain type and at a certain site. For instance, a first site might require three months to provision a certain amount of new capacity, while another site might requires six months to provision the same amount of new capacity. In such a situation (assuming other threshold parameters are equal), the site that requires a six month provisioning lead time will be more sensitive to reductions in available capacity and will have a higher minimum threshold for available capacity compared to the site that requires a three month provisioning lead time. For example, the site that requires a six month provisioning lead time may change from being represented by a green symbol, or another symbol indicating available capacity is above the minimum threshold, to being represented by a red symbol, or another symbol indicating available capacity is below the minimum threshold, more quickly on a heatmap compared to the site that has only a three month lead time. This configurable parameter (provisioning lead time) can allow users to define appropriate buffers and thresholds for capacity to compensate for the specific lead time for particular site.

An exemplary data set including a provisioning lead time parameter is below:

| From | To | Prov. Lead Time | Min. Threshold | Capacity Type | Media |
|------|----|-----------------|----------------|---------------|-------|
| X | Y | 6 Months | 64 Pairs Available | Patch Panel | SMF |
| P | Q | 3 Months | 32 Pairs Available | Patch Panel | SMF |
| X | Y | 6 Months | 30 % Available | Conduit | N/A |
| P | Q | 3 Months | 15 % Available | Conduit | N/A |

In this data set, the "From" and "To" fields can indicate two endpoints between which the data transmission capacity is of interest. The first two rows indicate a minimum threshold amount of single mode optical fiber (SMF) pairs between two patch panel endpoints, based on a six or three month provisioning lead time for new capacity. The last two rows indicate a minimum threshold amount of physical capacity in conduits connecting between the same pairs of endpoints.

The service 122 can be accessed by users for various purposes, such as to input data related to new components that have been added to the environment, remove data related to components that have been removed, change or correct current data, input data regarding how the current components are being used, or input data regarding reservations for future use of the components. Users may also input data regarding components that are damaged or unusable or otherwise need to be replaced.

Users may also access the service 122 to retrieve information regarding the maximum capacities, used capacities, reserved capacities, remaining available capacities, threshold capacities, and/or other information relating to any of the components in the environment.

An administrator interface tool 130 can be included that allows predetermined administrators full access to the service 122, database 124, and threshold policy 128. The administrator interface tool 130 can be used, for example, to indicate that a certain amount of capacity is currently being used in a given component, to indicate certain capacity no longer in use, or to reserve capacity in selected components for future use. Reserving future use can be done, for example, by changing the status of a selected component in the database 124 to "reserved for project" and entering a project ID to identify the project. Other changes an administrator may make include indicating certain currently installed hardware components that are damaged, dysfunctional, operating outside of desired tolerances, or permanently available for future use. Administrator access can be allowed via a website user interface, or other interface, directly accessing the service 122. Administrator access can be limited via a password or other security scheme.

Other users, such as vendors who install new components in the environment, can access the service 122 via a vendor interface tool 132, such as via the Internet or other network connection 134. These users may not have full access to the data stored in the database 124, or the ability to change the status of how the various components are being used. Other levels of access to the service 122 can also be permitted, such to allow a user to indicate when certain components are being used or are no longer being used. For example, when a particular project begins, the amount of component capacity that the project uses can be entered into the service 122 such that the database 124 can be correspondingly updated. Similarly, when a project ends, the amount of component capacity that the project was using can be changed from used to available in the database 124. After each such transaction, the service 122 can recalculate the total used and available capacity for each component and update that information in the database.

Figure 4:
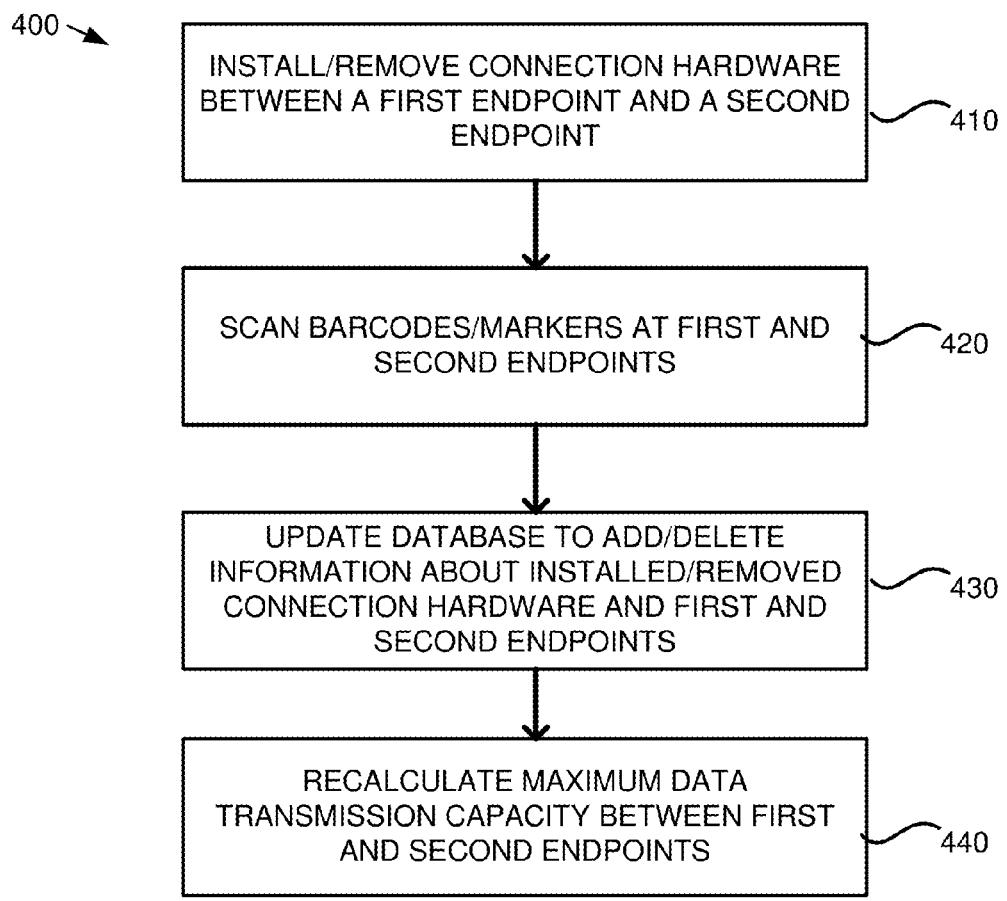
FIGS. 4 and 5 are flowcharts illustrating exemplary methods disclosed herein.

FIG. 4 illustrates an exemplary process 400 related to installing and/or removing connection hardware between two endpoints (block 410). When a new data connector, such as an optical fiber cable, is installed between two endpoints, such as two patch panels, the installer or other person can input to the service 122 certain information about the new component and the two endpoints. Each of the endpoints can include a marker (e.g., a radio-frequency identification (RFID) tag, a near-field communication (NFC) tag, or an optical code, such as a barcode) or other identifier, that that installer can scan with a reader (block 420). Scanning the marker can input to the service 122 the unique identity of the endpoint component. Using the endpoint component markers, the service 122 can update the database 124 (block 430) to indicate, for example, exactly where the new connector is located and what it is connected to. The user can also input parameters of the new connector when it is installed, such as a unique identifier for the new connector, the type or class of connector (e.g., fiber or wire), physical size of the new connector (e.g., cross-sectional size), and a maximum data transmission capacity (e.g., in bits per second) of the connector. The new connector may also be assigned a marker that the installer can scan to automatically input relevant information about the connector to the service 122. After a new data connector is added, the service 122 can recalculate (block 440) the maximum data transmission capacity between the two endpoints to account for the new capacity added by the newly installed connector. A similar process can be carried out when an installed connector is decommissioned, un-installed or removed.

Similarly, when new endpoint components are added to the environment, or removed, the installer can create a new marker and unique identifier for the new component and scan the new marker into the service 122. The creation of a new unique identifier and marker can comprise entering relevant parameters about the new component into the service 122. For example, the installer may need to enter the type of device (e.g., a patch panel), the total number of ports for receiving network connectors, the type of connectors the ports can receive (e.g., fiber or wire), the total data transmission capacity for each port, the overall total data transmission capacity of the component, how much space the component has available for other components, physical dimensions of the component, power consumption specs for the component, and/or various other information about the component that may be useful to know in the future. When the new endpoint component is installed, additional information about the installation location and connection to the new component can also be input to the service 122 to be stored in the database 124. For example, the location of the new device (e.g., the rack it is installed on, the room it is located in, etc.) can be added to the database 124.

Figure 5:
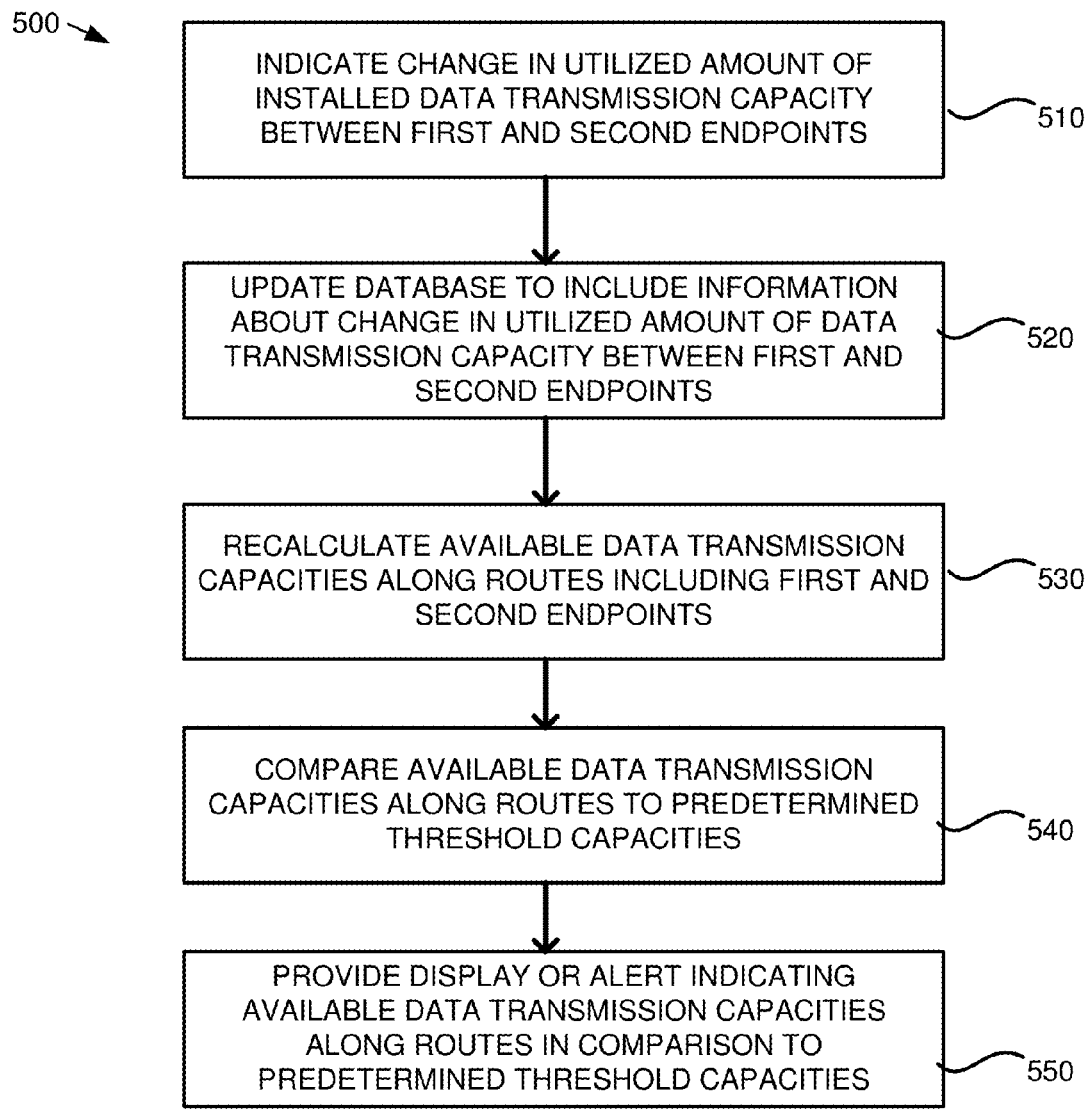

FIG. 5 illustrates an exemplary process 500 relating to managing the currently used and reserved capacities (e.g., utilized capacity) of the various components in an environment. When a user indicates to the service 122 a change to the utilized amount of the currently installed data transmission capacity between two endpoints (block 510), the service 122 can update the database 124 (block 520) to include the received information or change currently stored data to account for the newly received information. For example, the user may input information indicating the additional capacity is planned to be used in the future, or that currently used capacity is no longer going to be used (e.g., a program is ending). The user may also input other changes to the currently installed capacity, such as indications that certain hardware components have become inoperable, have a physical problem that diminishes their transmission capacity, are not functioning within desired performance tolerances, or are otherwise permanently unavailable for future use. The user may input this information via a website interface or via an application having direct access to the service 122, for example. The service 122 can then recalculate (block 530) the available data transmission capacities along data transmission routes in the environment that includes to two endpoints, compare (block 540) the recalculated available data transmission capacities along the routes to predetermined threshold capacities accessed from the threshold policy 128, and/or provide a display (block 550) indicating updated available data transmission capacities along the routes that include the two endpoints. Thus, the service 122 can take into account changes or planned changes in the amount of the capacity that is being used and provide indications to users with updated information. Such indications may include visual displays, emails, text messages, audio alerts, updates or changes to application or website content, etc. This information may be used by a vendor, for example, to decide whether and/or when to install new data connectors between the two endpoints and/or to install new endpoint components, such as if additional ports are needed to accommodate the new connectors.

The table 200 of FIG. 2 includes an exemplary set of data related to data connectors installed in the exemplary environment 100 of FIG. 1. Each row includes data for a particular connector and each column 202-220 indicates a particular data field for each connector. Column 202 includes a unique identifier for each connector. The first row is for connector 110, the second for connector 112, and so on. These are simplified unique connector identifiers, whereas actual identifiers may be in any format. Column 204 includes information regarding the class or type of the connector. For example, "CLASS A" listed for connector 110 can indicate an optical fiber class of connectors, or a metal wire type of connector. Other types of connector classes may include non-data transmitting devices, such as conduits, risers, sleeves, trays, raceways, etc., that contain or support other data-transmitting connectors.

As shown in FIG. 1, connector 110 is connected to endpoint A and endpoint B, which are given unique identifiers 102 and 104, respectively. These endpoint identifiers can be stored in columns 206 and 208 when the connector is installed. Columns 210 and 212 can similarly include barcodes or other markers for the two endpoints of the connector. Column 220 can also include a location of the connectors, such as to identify the environment 100 where it is located, or more specific information about the building, floor, room, or rack where the connector is located.

Column 214 can include data relating to the maximum capacity of the connector. For data transmission connectors, this field can include a maximum bits per second capacity for the connector. For non-data transmitting connector devices, such as conduits and risers, the column 214 can include a physical maximum capacity, such as the total cross-sectional area of a conduit, or the maximum number of cables a tray can hold.

Column 216 can include data relating to the amount of capacity of the connector that is currently used. For data transmission connectors, this can be the amount of data that is currently being transmitted along the connector, or an average amount of data transmitted over a period of time, or a maximum or peak amount of data that is transmitted, a percentage of the maximum capacity, or some other parameter that indicates how much that connector is being used to transmit data at the current time. For non-data-transmitting connector devices, the column 216 can indicate that total number of cables currently installed in the device, what cross-sectional area of conduit is occupied by cables, of other data indicating the current amount or percentage of the device that is being occupied by data connectors. Similarly, column 218 can include data relating to the amount of connector capacity that is reserved for future use. For a given connector, the data in fields 214, 216, and 218 can be in the same units, such as all three fields being in bits per second, number of cables, number of ports, cross-sectional area, etc. In this way, the service 122 may be able to subtract fields 216 and 218 from field 214 to calculate the remaining available capacity for each connector, and then compare that value to a threshold capacity from the threshold policy 128, which can also be stored in the same units for each of comparison and calculation.

Any number of other data fields relating to the connectors may also be included in the table 200. Also, any of the fields that are currently shown in the table 200 may optionally not be included.

The table 300 of FIG. 3 includes an exemplary set of data related to endpoint components installed in the exemplary environment 100 of FIG. 1. Each row includes data for a particular endpoint component and each column 302-320 indicates a particular data field for each endpoint component. Column 302 includes a unique identifier for each endpoint component. The first row is for endpoint A, which is given the identifier 102; the second row is for endpoint B, which is given the identifier 104, and so on. These are simplified unique endpoint identifiers, whereas actual identifiers may be in any format.

Column 304 includes information regarding the type of the endpoint component. For example, "TYPE A" listed for endpoint 102 can indicate a patch panel type of endpoint. Other types of endpoint types may include a single server, a specific room of a data center, a floor of a data center, an entire data center, etc.

Column 306 indicates the location of the endpoint, such as the room, floor, or facility within which an endpoint patch panel is located. Each of endpoints 102, 104, 106, and 108 are indicated as being in location 100, representing the environment 100 shown in FIG. 1.

Columns 308 and 310 can include data indicating the total number of ports an endpoint includes and the number of those ports that are currently used by connectors. For example, for a patch panel endpoint, field 308 may indicate that patch panel has 24 total ports for receiving data transmission cables, and field 310 may indicate that 12 of those ports currently have data transmission cables plugged into them. For a room or floor type of endpoint, as another example, field 308 may indicate the maximum number of data transmission cables that can be installed to connect the particular room or floor to other rooms or floors, and field 310 can indicate the current number of cables that connect that particular room or floor to other rooms or floors.

Columns 312 can include data relating to the maximum data transmission capacity of the endpoint, such as the maximum amount of bits per second that the device can transmit and/or process. This value may be expressed in terms of the maximum capacity per port in the endpoint device or the maximum capacity of all of the ports combined, or the maximum capacity that the device can process and transmit between the various ports. Column 314 can include data relating to the currently installed capacity at the particular endpoint. This field can indicate how much data is currently being transmitted through the endpoint, or an average data throughput over a given period of time. Column 316 can include data relating to that amount of capacity of the endpoint that is reserved for future use.

For example, endpoint C in FIG. 1 may transmit data between endpoint A and endpoint B via connectors 112 and 114, as currently arranged. However, endpoint C may have additional ports and data transmission capacity and be capable of receiving additional future connectors to transmit a greater total amount of data. Column 312 can indicate the maximum amount of data that endpoint C can transmit when a maximum number of connectors are connected to it and/or when a maximum volume of data is transmitted through the connected connectors. This can be a theoretical maximum (e.g., number of ports multiplied by the maximum capacity of each connector) or a measured maximum determined by testing the device, for example. Column 314 can indicate total amount of capacity that is currently installed via connectors 112 and 114. Column 316 can indicate a planned future use of capacity, such as if a new project expects to occupy a certain of amount of data transmission capacity along the route between endpoint A to endpoint C to endpoint B.

Column 318 can indicate the class of connectors that can be connected to the endpoint, such fiber or wired cables, or as a class that includes a certain type of jack or connector that fits into the ports of the endpoint device. Column 320 can indicate all of the connectors that are currently connected to the given endpoint. For example, row 104 indicates that endpoint B is currently connected to connectors 110, 114, 118, and 120.

Figure 6:
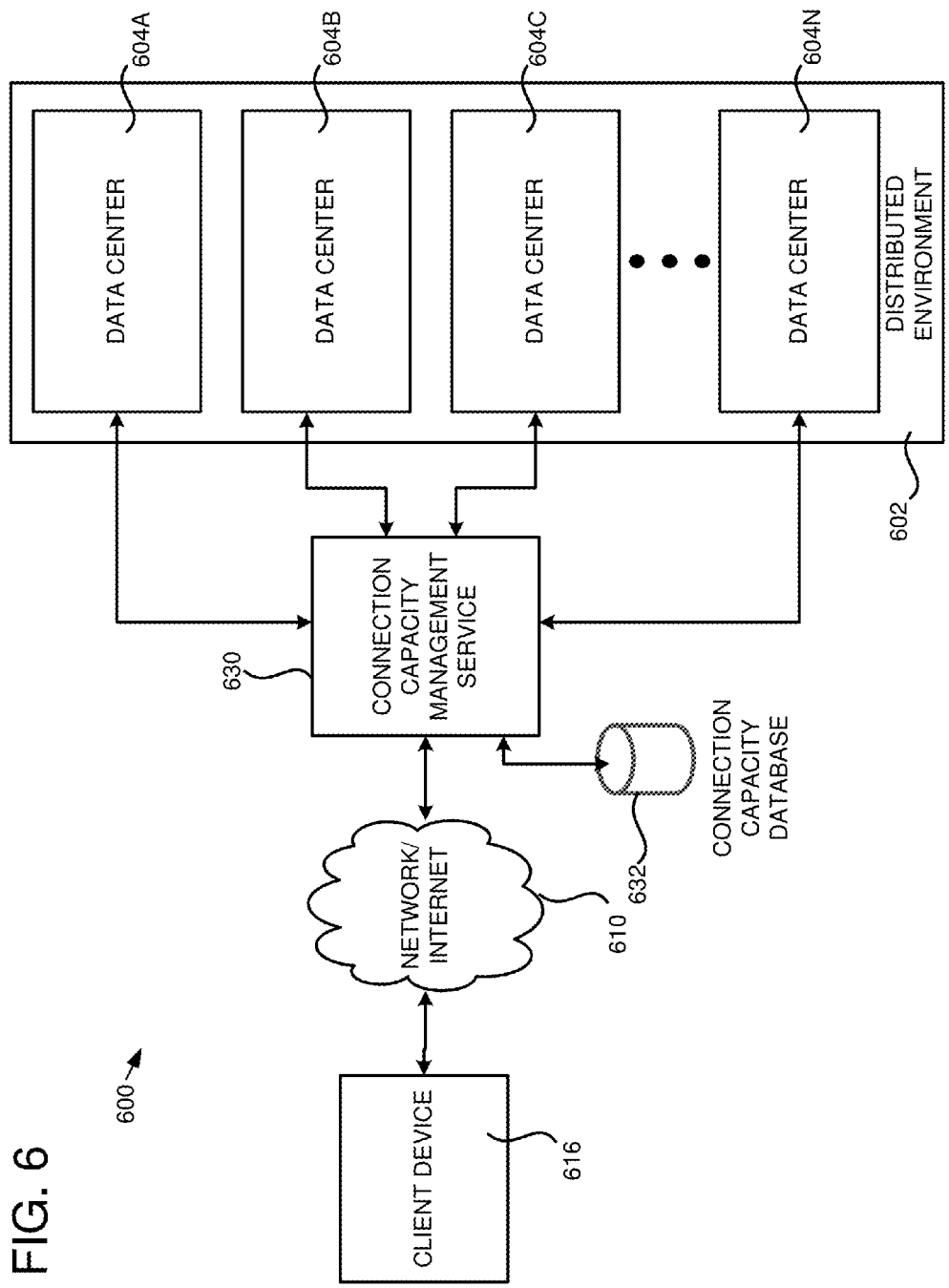
FIG. 6 is a diagram of an exemplary system for interfacing with a connection capacity management service via a remote client device.

FIG. 6 illustrates an exemplary system 600 for interfacing with a connection capacity management service 630 via a remote client device 616 via the Internet or other network 610. The service 630 can be connected to a large scale distributed environment 602 that includes a plurality of data centers 604A through 604N, as well as being connected to a connection capacity database that stores a variety of data about the endpoint components and connection components in the environment 602. Each of the data centers 604 can be interconnected with one another and/or with other facilities. The service 630 can be similar in functionality to the service 122 disclosed herein, and the database 632 can include data sets that are similar to those described with reference to the database 124. The service 630 and database 632 can provide a central management system for managing a variety of distributed data centers and the variety of components and connections within each data center. This can allow a vendor or other user to access a single website or application to review information about all of the managed components of the various data centers 604 using any client device 616 from any location.

The user may obtain reports generated from the service 630 showing how much capacity is available, used, and reserved in any portion of the environment 602. Such reports may be obtained based on searches requested by users. For example, a user may search for all routes or components in the environment that have less than 10% of their maximum capacity available, or where the available capacity is below a predetermined threshold capacity level. Based on the reports, the user can determine where, how much, and/or when additional data connections or other components need to be added to the environment. The reports may include heat maps or other displays that illustrate how crowded or available certain routes in the environment are or will be in the future. This can provide vendors more lead to order and install new components in the environment before data traffic becomes overly crowded.

Figure 7:
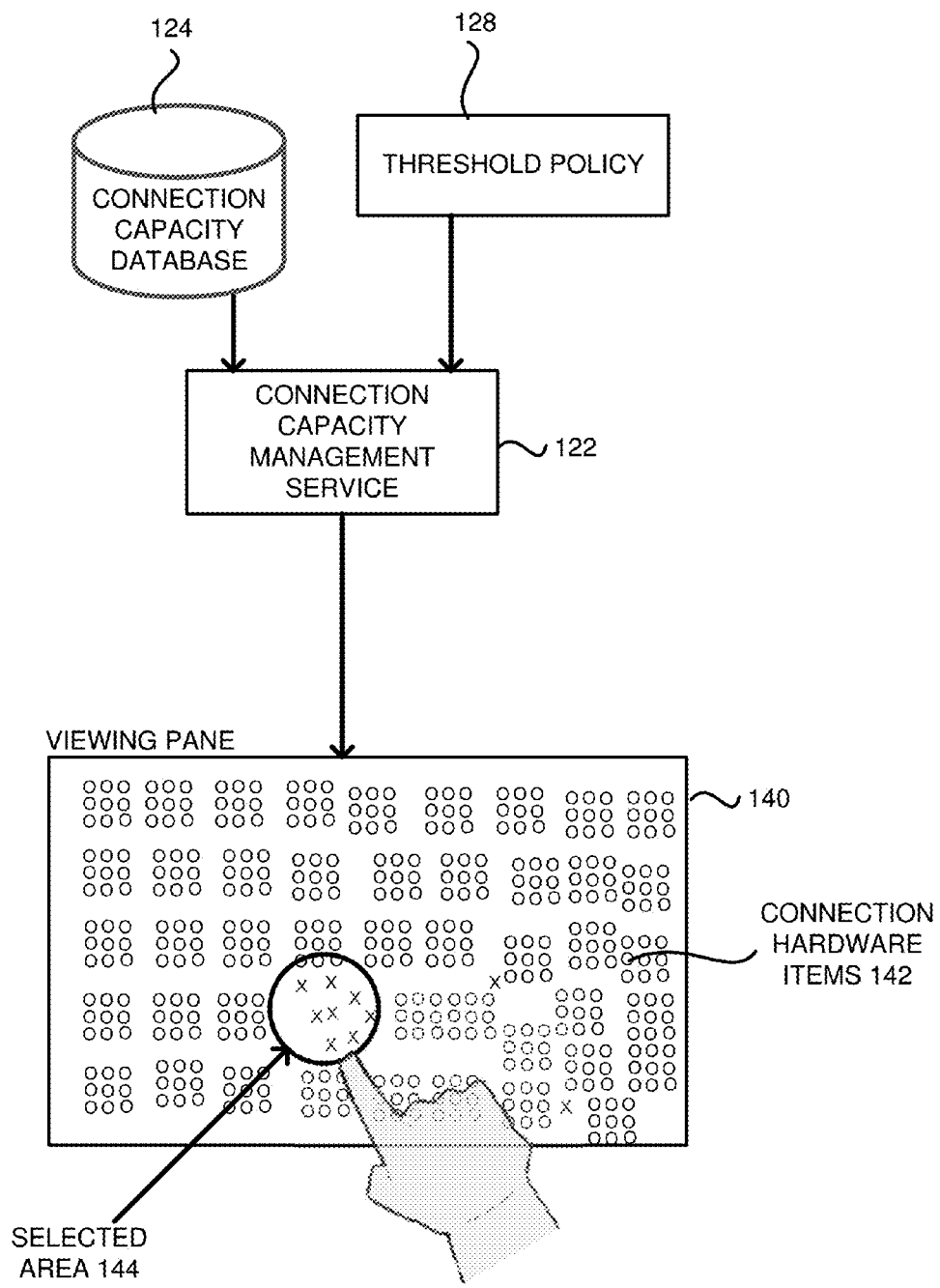
FIG. 7 shows an exemplary visual display created using connection capacity data and a threshold policy, wherein the display includes a user selectable area of interest.

FIG. 7 shows an exemplary display, or heat map, 140 that the service 122 can generate using data retrieved from the database 124 in comparison with capacity thresholds retrieved from the threshold policy 128. The X's and O's that indicate hardware components 142 (e.g., endpoint components and/or connection components) in the environment that are analyzed by the service 122. An "O" indicates a component that has an amount of available capacity that is greater than a minimum threshold value, while an "X" indicates a component that has an amount of available capacity below the minimum threshold value. The heat map 140 can be geographically oriented, or oriented in any other logical manner for ease of interpretation. The user can select an area of interest where available capacities have fallen below the minimum threshold, or hot spot, 144.

The particular representation of the heat map 140 can be easily modified based on a desired look-and-feel. As shown, a user can select the hot 144 spot through user touch for touch displays or through other user input devices. In response to the user selection, a hot spot resource list can be generated which is a subset of all the hardware components 142, but within the particular geometric area 144 on the heat map 140. The geometric area 144 can be predefined or user selectable, such as through a user gesture input command. In any event, the hot spot resource list can allow a user to inquire into further information about the resources in the hot spot.

Figure 8:
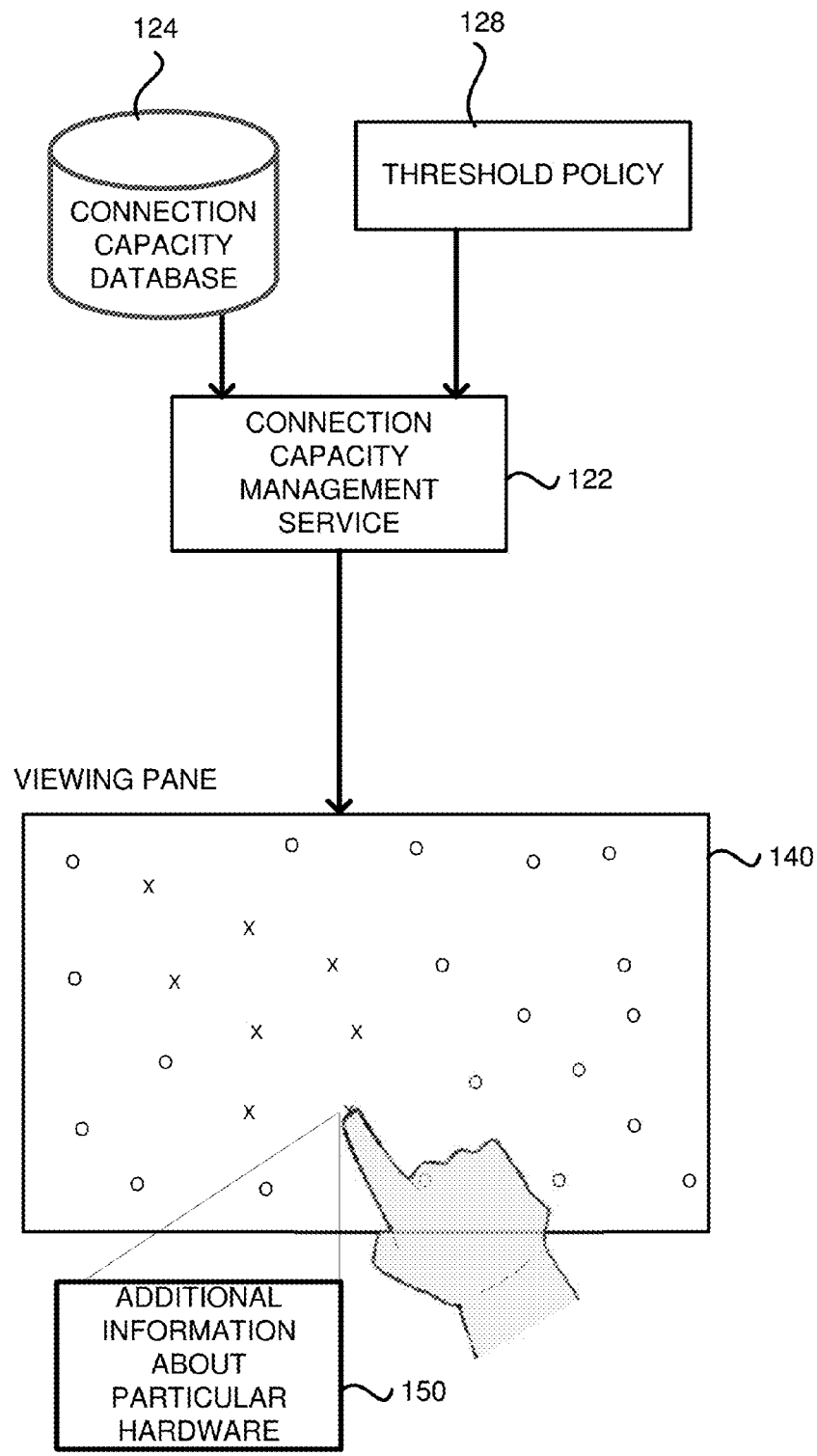
FIG. 8 shows a visual display that results from the selected area of interest of FIG. 7, with a reduced set of hardware item associated with the area of interest.

FIG. 8 shows an exemplary result of the user selecting the hot spot 144 from FIG. 7. The heat map 140 in FIG. 8 shows the enlarged view of the hot spot 144 showing the reduced set of hardware components. As shown, a user can select (or mouse over) a particular component in order to generate a sub-viewing pane 150 that provides particular details about the selected hardware component. For example, the user might select an "X" component to see how crowded the data traffic is at that location and/or how critical that the data traffic is, and may use this information to decide that additional capacity needs to be added at that location. The sub-viewing pane 150 can list any of the information stored in tables 200 or 300, or other information.

Figure 9:
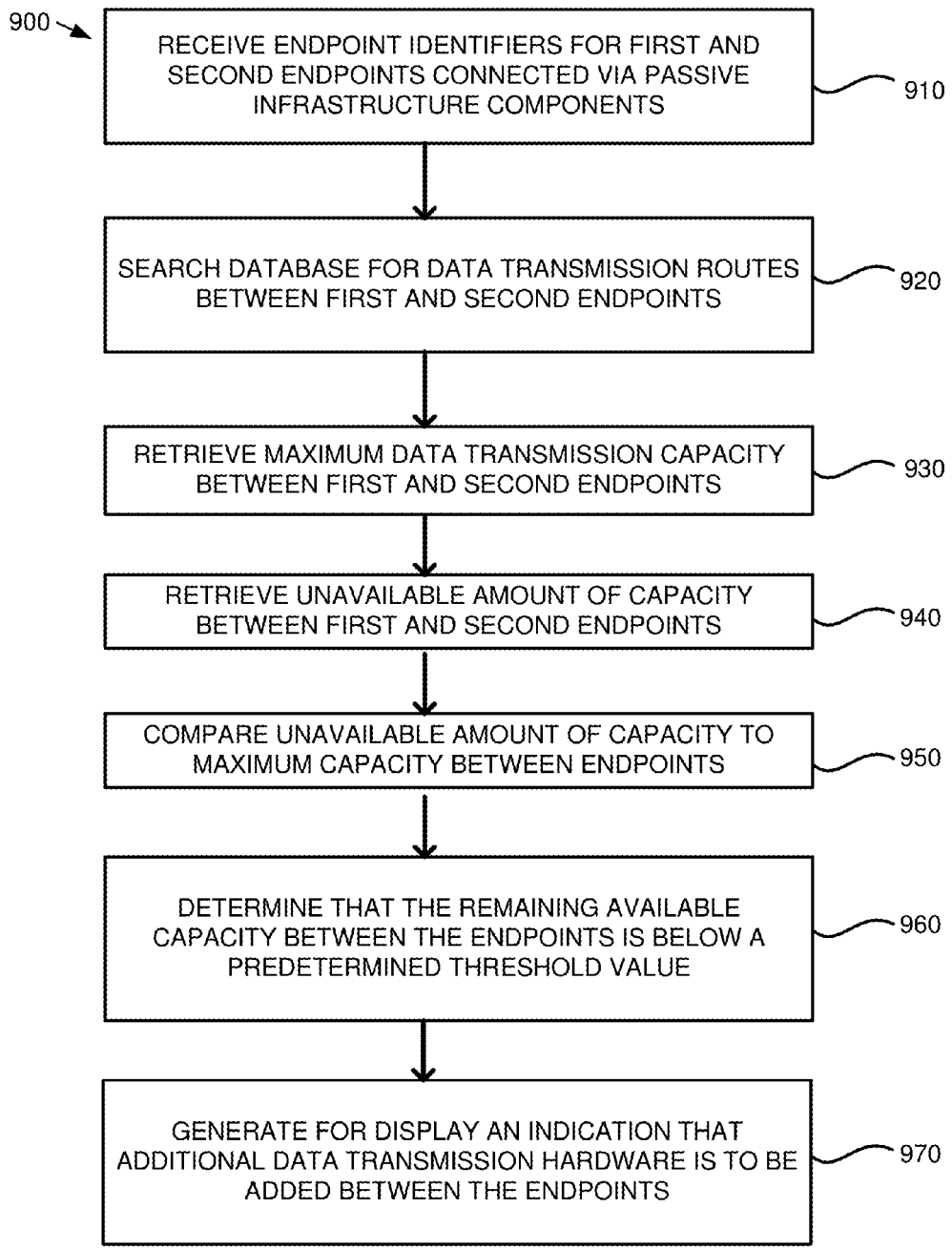
FIG. 9 is a flowchart illustrating an exemplary method disclosed herein.

FIG. 9 is a flow chart illustrating an exemplary method 900 for managing data transmission capacity between endpoints in a networked computing environment. At block 910, the connection capacity management service 122 receives an indication of first and second endpoints in the network that are connected by data transmission hardware. This indication can be input by a user to query information about the connections between those endpoints, or can be part of an automated process of monitoring the connections between a plurality of different pairs of endpoints in the system. At block 920, the service 122 can search in the database 124 for a plurality of data transmission routes connecting the first and second endpoints. This can return all of the possible routes that data can transfer between the two endpoints, including multi-stage routes passing through other endpoint components. At block 930, the service 122 can retrieve from the database 124 a maximum data transmission capacity along each of the different routes between the first and second endpoints. Each of the different routes can include any number of individual data-transmitting cables and non-data-transmitting devices that constrain the cables. At block 940, the service 122 can retrieve from the database 124 an unavailable amount of the maximum data transmission capacity between the first and second endpoints that is currently used for data transmission or reserved for planned future use. At block 950, the service 122 can compare the maximum data transmission capacity and the unavailable amount of the maximum data transmission capacity along all of the routes between the first and second endpoints. This can include subtracting the unavailable amount from the maximum amount, determining a ratio between the unavailable amount and the maximum amount, and/or otherwise performing a calculation based on the unavailable amount and the maximum amount. At block 960, the service 122 can determine that a remaining available amount of data transmission capacity between the first and second endpoints is less than a predetermined threshold value. The predetermined threshold value can be obtained from the threshold policy 128. At block 970, the service 122 can generate for display an indication that additional data transmission hardware is to be added between the first and second endpoints to increase the available amount of data transmission capacity between the first and second endpoints. Such a display can be shown on a client device coupled to the service 122, such as via the administrator interface tool 130 or the vendor interface tool 132. The service 122 can also generate other types of indicators to users, such as emails, text messages, audio alerts, updates or changes to application or website content, etc. In some embodiments, the service 122 may be queried by a user to generate other types of reports, such as non-graphical reports, that list relevant capacity information.

In some embodiments, the service 122 can detect a current, or live, data transmission usage through any given endpoint component or connector in the environment. Such live usage information can be used to provide more accurate current usage data and/or to audit calculated current usage values that are based on information users have previously input into the system.

Figure 10:
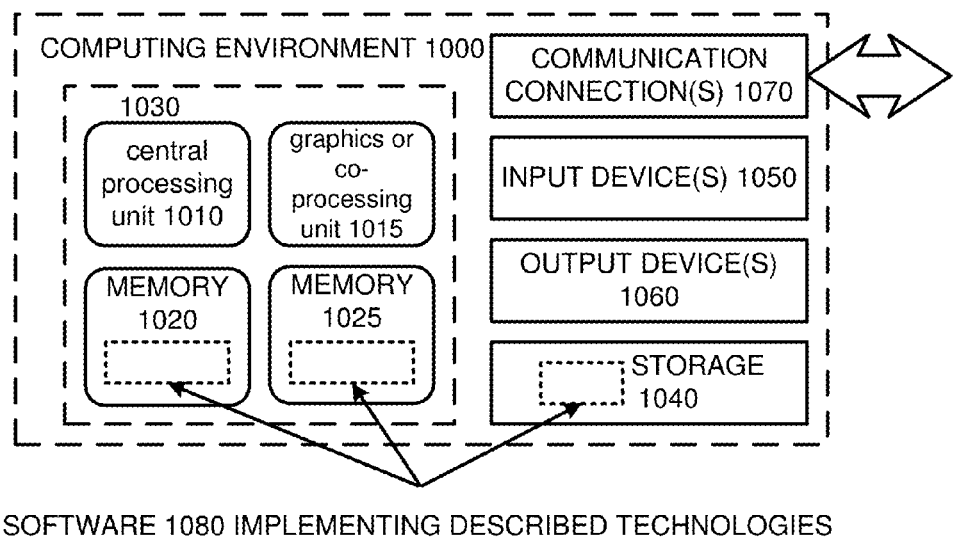
FIG. 10 depicts a generalized example of a suitable computing environment in which the described technology may be implemented.

FIG. 10 depicts a generalized example of a suitable computing environment 1000 in which the described technology may be implemented. The computing environment 1000 is not intended to suggest any limitation as to scope of use or functionality, as the innovations described herein may be implemented in diverse general-purpose or special-purpose computing systems. For example, the computing environment 1000 can be any of a variety of computing devices (e.g., desktop computer, laptop computer, server computer, tablet computer, etc.).

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed technology may be applied, it should be recognized that the illustrated embodiments are only preferred examples and should not be taken as limiting the scope of the disclosure. Rather, the scope of the disclosure at least as broad as the following claims. We therefore claim all that comes within the scope of these claims.

What is claimed is:

1. A method of managing data transmission capacity between endpoints in a passive network environment that includes a plurality of endpoints and passive infrastructure components connected to the plurality of endpoints, the method comprising:

assigning a unique identifier to each of the plurality of endpoints in the passive network environment;

storing, by a connection capacity management service, the unique identifiers for the plurality of endpoints in a database in correlation with data associated with the passive infrastructure components connected to the plurality of endpoints, the database being distinct from the passive network environment;

receiving, by the connection capacity management service, a selection of a first endpoint of the plurality of endpoints and a second endpoint of the plurality of endpoints, the first end point and the second endpoint being connected by one or more of the passive infrastructure components;

by the connection capacity management service:

using the selected first endpoint and second endpoint, searching in the database for a plurality of data transmission routes connecting the first endpoint and the second endpoint via the passive infrastructure components;

for each data transmission route of the plurality of data transmission routes, retrieving from the database a maximum data transmission capacity between the first endpoint and the second endpoint along the data transmission route;

for each data transmission route of the plurality of data transmission routes, retrieving from the database an unavailable data transmission capacity between the first endpoint and the second endpoint, the unavailable data transmission capacity being a portion of the maximum data transmission capacity that is either currently used for data transmission or is reserved for planned future use;

comparing, by the connection capacity management service, the maximum data transmission capacity and the unavailable data transmission capacity to calculate an available data transmission capacity between the first endpoint and the second endpoint along the plurality of data transmission routes;

determining, by the connection capacity management service, that the available data transmission capacity between the first endpoint and the second endpoint is less than a predetermined threshold value;

generating for display, by the connection capacity management service, an indication that one or more additional passive infrastructure components are to be added to the passive network environment between the first endpoint and the second endpoint to increase the available data transmission capacity between the first endpoint and the second endpoint;

receiving an indicator that a portion of the maximum data transmission capacity between the first endpoint and the second endpoint has been used, has been reserved for future use, or has become permanently unavailable;

recalculating the available data transmission capacity between the first endpoint and the second endpoint based on the indicator;

redetermining if the available data transmission capacity between the first and second endpoints is less than the predetermined threshold value; and updating the database with data indicative of the portion of the maximum data transmission capacity between the first endpoint and the second endpoint that has been used, has been reserved for future use, or has become permanently unavailable, and storing data indicative of the recalculated available data transmission capacity between the first endpoint and the second endpoint in the database.

2. The method of claim 1, further comprising:
after the generating for display step, receiving an indicator that one or more additional passive infrastructure components have been installed between the first endpoint and the second endpoint;

receiving information indicative of a total data transmission capacity of the additional installed passive infrastructure components; and recalculating the maximum data transmission capacity between the first endpoint and the second endpoint via the plurality of data transmission routes based on the additional installed passive infrastructure components.

3. The method of claim 2, further comprising storing the information indicative of the total data transmission capacity of the additional installed passive infrastructure components and the recalculated maximum data transmission capacity between the first endpoint and the second endpoint in the database.

4. The method of claim 1, wherein generating for display comprises:
providing a visual display showing a plurality of unique pairs of connected endpoints in the passive network environment, the plurality of unique pairs of connected endpoints including a pair representing the first endpoint and the second endpoint; and indicating in the visual display which of the plurality of unique pairs of connected endpoints have a total available data transmission capacity that is below the predetermined threshold value relative to the maximum data transmission capacity for the respective pair of connected endpoints.

5. The method of claim 1, wherein the passive infrastructure components comprise optical fibers, metal wires, or other data-transmitting components, and the passive infrastructure components also comprise conduits, risers, cable trays, or other non-data-transmitting components that constrain the data-transmitting components.

6. A computer-readable storage device including instructions stored thereon for executing a method of managing data transmission capacity between endpoints in a passive network environment that includes a plurality of endpoints and passive infrastructure components connected to the plurality of endpoints, the method comprising:
assigning a unique identifier to each of the plurality of endpoints in the passive network environment;

storing, by a connection capacity management service, the unique identifiers for the plurality of endpoints in a database in correlation with data associated with the passive infrastructure components connected to the plurality of endpoints, the database being distinct from the passive network environment;

receiving, by the connection capacity management service, a selection of a first endpoint of the plurality of endpoints and a second endpoint of the plurality of endpoints, the first end point and the second endpoint being connected by one or more of the passive infrastructure components;

by the connection capacity management service:
using the selected first endpoint and second endpoints, searching in the database for a plurality of data transmission routes connecting the first endpoint and the second endpoint via the passive infrastructure components;

for each data transmission route of the plurality of data transmission routes, retrieving from the database a maximum data transmission capacity between the first endpoint and the second endpoint along the data transmission route;

for each data transmission route of the plurality of data transmission routes, retrieving from the database an unavailable data transmission capacity between the first endpoint and the second endpoint, the unavailable data transmission capacity being a portion of the maximum data transmission capacity that is either currently used for data transmission or is reserved for planned future use;

comparing, by the connection capacity management service, the maximum data transmission capacity and the unavailable data transmission capacity to calculate an available data transmission capacity between the first endpoint and the second endpoint along the plurality of data transmission routes;

determining, by the connection capacity management service, that the available data transmission capacity between the first endpoint and the second endpoint is less than a predetermined threshold value;

generating for display, by the connection capacity management service, an indication that one or more additional passive infrastructure components are to be added to the passive network environment between the first endpoint and the second endpoint to increase the available data transmission capacity between the first endpoint and the second endpoint;

receiving an indicator that a portion of the maximum data transmission capacity between the first endpoint and the second endpoint has been used, has been reserved for future use, or has become permanently unavailable;

recalculating the available data transmission capacity between the first endpoint and the second endpoints based on the indicator;

redetermining if the available data transmission capacity between the first and second endpoint is less than the predetermined threshold value; and updating the database with data indicative of the portion of the maximum data transmission capacity between the first endpoint and the second endpoint that has been used, has been reserved for future use, or has become permanently unavailable, and storing data indicative of the recalculated available data transmission capacity between the first endpoint and the second endpoint in the database.

7. The storage device of claim 6, wherein the method further comprises:
after the generating for display step, receiving an indicator that one or more additional passive infrastructure components have been installed between the first endpoint and the second endpoint;
receiving information indicative of a total data transmission capacity of the additional installed passive infrastructure components; and
recalculating the maximum data transmission capacity between the first endpoint and the second endpoint via the plurality of data transmission routes based on the additional installed passive infrastructure components.

8. The storage device of claim 7, wherein the method further comprises storing the information indicative of the total data transmission capacity of the additional installed passive infrastructure components and the recalculated maximum data transmission capacity between the first endpoint and the second endpoint in the database.

9. The storage device of claim 6, wherein generating for display comprises:
providing a visual display showing a plurality of unique pairs of connected endpoints in the passive network environment, the plurality of unique pairs of connected endpoints including a pair representing the first endpoint and the second endpoint; and
indicating in the visual display which of the plurality of unique pairs of connected endpoints have a total available data transmission capacity that is below the predetermined threshold value relative to the maximum data transmission capacity for the respective pair of connected endpoints.

10. The storage device of claim 6, wherein the indication comprises a heat map that shows at least some of the passive infrastructure components in the passive network environment; and
indicating in the heat map which of the plurality of passive infrastructure components have a total available amount of data transmission capacity that is below the predetermined threshold value.

11. The storage device of claim 6, wherein the passive infrastructure components comprise optical fibers, metal wires, or other data-transmitting components, and the passive infrastructure components also comprise conduits, risers, cable trays, or other non-data-transmitting components that constrain the data-transmitting components.

12. A system for managing data transmission capacity between endpoints in a network, the system comprising:
a plurality of endpoint components in the network;
a plurality of passive infrastructure components in the network connecting the plurality of endpoint components;
at least one computing device comprising a processor and memory, the at least one computing device being in signal communication with the network;
a connection capacity management service operative on the at least one computing device; and
a connection capacity database in signal communication with the at least one computing device;
wherein, for a selected two endpoint components of the plurality of endpoint components, the connection capacity management service is operable to determine all data transmission routes along the passive infrastructure components connecting the two selected endpoint components and is operable to calculate an available data transmission capacity between the two selected endpoint components based on maximum data transmission capacity data and unavailable data transmission data stored in the connection capacity database for the passive infrastructure components connecting the two selected endpoint components;
wherein the connection capacity management service is operable to compare the available data transmission capacity between the two selected endpoint components to a predetermined threshold value to determine whether or not additional passive infrastructure components should be added between the two selected endpoint components to increase the available data transmission capacity therebetween;
wherein the connection capacity management service is further operable to receive an indicator that a portion of the maximum data transmission capacity between the two selected endpoint components has been used, has been reserved for future use, or has become permanently unavailable, recalculate the available data transmission capacity between the two selected endpoint components based on the indicator, and compare the recalculated available data transmission capacity to a predetermined threshold value.

13. The system of claim 12, wherein the connection capacity management service is further operable to receive an indication that additional passive infrastructure components have been installed between two selected endpoint components in the system, receive information indicative of a total data transmission capacity of the additional installed passive infrastructure components, and recalculate the available data transmission capacity between the two selected endpoint components based on the additional installed passive infrastructure components.

14. The system of claim 12, wherein the plurality of passive infrastructure components include data-transmitting cables, the plurality of passive infrastructure components further include non-data-transmitting devices that constrain the data-transmitting cables, and a maximum data transmission capacity of non-data-transmitting devices is based on a maximum number of data-transmitting cables that the non-data-transmitting devices are capable of constraining at once.

15. The system of claim 12, wherein each endpoint component of the plurality of endpoint components in the network includes a unique marker that can be scanned when the additional passive infrastructure components are installed in the system and connected to the endpoint component, wherein for each endpoint component the unique marker is configured to provide information to the connection capacity management service regarding the identity and location of the endpoint component, such that the endpoint component information can be correlated with information regarding the installed passive infrastructure components in the connection capacity database.

* * * * *